US 6,682,195 B2

(12) United States Patent
Dreher (10) Patent No.: US 6,682,195 B2
(45) Date of Patent: Jan. 27, 2004

(54) CUSTOM EYEGLASS MANUFACTURING METHOD

(75) Inventor: Andreas W. Dreher, Escondido, CA (US)

(73) Assignee: Ophthonix, Inc., San Diego, CA (US)

( * ) Notice: Subject to any disclaimer, the term of this patent is extended or adjusted under 35 U.S.C. 154(b) by 89 days.

(21) Appl. No.: 10/046,656

(22) Filed: Oct. 25, 2001

(65) Prior Publication Data

US 2003/0081173 A1 May 1, 2003

(51) Int. Cl.[7] .................................................. A61B 3/10
(52) U.S. Cl. ........................................................ 351/204
(58) Field of Search ................................. 351/204, 205, 351/227, 246, 41, 124, 156, 158; 382/282

(56) References Cited

U.S. PATENT DOCUMENTS

| | | |
|---|---|---|
| 3,933,411 A | 1/1976 | Winner |
| 3,973,837 A | 8/1976 | Page |
| 4,268,133 A | 5/1981 | Fischer et al. |
| 4,666,236 A | 5/1987 | Mikami et al. |
| 4,869,587 A | 9/1989 | Breger |
| 4,874,234 A | 10/1989 | Wichterle |
| 4,996,123 A | 2/1991 | Nomura et al. |
| 5,100,589 A | 3/1992 | Ticknor |
| 5,114,628 A | 5/1992 | Hofer et al. |

(List continued on next page.)

FOREIGN PATENT DOCUMENTS

| | | |
|---|---|---|
| DE | 197 52 729 A1 | 6/1999 |
| DE | 100 07 705 A1 | 9/2001 |
| EP | 0 472 384 A2 | 8/1991 |

(List continued on next page.)

OTHER PUBLICATIONS

Moretti, Michael, "New laser–based technologies incubate," Opthamology News, Nov. 29, 2001.

Primary Examiner—George Manuel
Assistant Examiner—Ruby L. Johnson
(74) Attorney, Agent, or Firm—Knobbe Martens Olson & Bear LLP (57) ABSTRACT

A Custom Eyeglass Manufacturing Method includes a wavefront measuring device with a plurality of cameras directed at a patient's face. The resulting images are processed by a computer to determine the location of pupils, center of pupils, pupil distance, width of face, ear location, distance of corneal apex from the wavefront measuring device, distance from ear to corneal apex, and other desired parameters necessary to quantify a patient's face for custom eyeglass fittings. Moldings may be applied to patient's nose, temples, and ears in order to construct a pair of eyeglasses that fix perfectly on patient's head. Additionally, a test frame may be used in combination with the wavefront measuring device in order to allow computer to find some of the areas automatically. Lastly, registration markers may be applied to either the test frame, the moldings, or both in order to further aide the computer in locating desired parameters.

19 Claims, 8 Drawing Sheets

U.S. PATENT DOCUMENTS

| | | |
|---|---|---|
| 5,116,684 A | 5/1992 | Fretz, Jr. et al. |
| 5,198,844 A | 3/1993 | Roffman et al. |
| 5,266,352 A | 11/1993 | Filas et al. |
| 5,343,260 A | 8/1994 | Henry et al. |
| 5,372,755 A | 12/1994 | Stoerr et al. |
| 5,406,340 A * | 4/1995 | Hoff .......................... 351/156 |
| 5,433,810 A | 7/1995 | Abrams |
| 5,448,312 A | 9/1995 | Roffman et al. |
| 5,528,321 A | 6/1996 | Blum et al. |
| 5,585,968 A | 12/1996 | Guhman et al. |
| 5,592,248 A | 1/1997 | Norton et al. .............. 351/246 |
| 5,606,378 A | 2/1997 | Van Meurs |
| 5,608,471 A | 3/1997 | Miller |
| 5,617,154 A | 4/1997 | Hoffman |
| 5,650,837 A | 7/1997 | Roffman et al. |
| 5,715,031 A | 2/1998 | Roffman et al. |
| 5,771,088 A | 6/1998 | Perrott |
| 5,777,719 A | 7/1998 | Williams et al. |
| 5,786,883 A | 7/1998 | Miller et al. |
| 5,835,192 A | 11/1998 | Roffman et al. |
| 5,861,934 A | 1/1999 | Blum et al. |
| 5,864,379 A | 1/1999 | Dunn |
| 5,872,613 A | 2/1999 | Blum et al. |
| 5,880,809 A | 3/1999 | Lieberman et al. |
| 5,929,969 A | 7/1999 | Roffman |
| 5,949,521 A | 9/1999 | Williams et al. |
| 5,953,098 A | 9/1999 | Lieberman et al. |
| 5,956,183 A | 9/1999 | Epstein et al. |
| 5,998,096 A | 12/1999 | Umemoto et al. |
| 6,081,632 A | 6/2000 | Yoshimura et al. |
| 6,089,711 A | 7/2000 | Blankenbecler et al. |
| 6,109,749 A | 8/2000 | Bernstein |
| 6,176,580 B1 | 1/2001 | Roffman et al. |
| 6,240,226 B1 | 5/2001 | Presby et al. |
| 6,274,288 B1 | 8/2001 | Kewitsch et al. |
| 6,319,433 B1 | 11/2001 | Kohan |
| 6,379,005 B1 | 4/2002 | Williams et al. |
| 6,533,418 B1 * | 3/2003 | Izumitani et al. ........... 351/204 |
| 2002/0196412 A1 | 12/2002 | Abitbol ...................... 351/246 |

FOREIGN PATENT DOCUMENTS

| | | |
|---|---|---|
| EP | 0 949 529 A2 | 4/1999 |
| EP | 1 011 006 A1 | 6/2000 |
| EP | 1 136 869 A1 | 9/2001 |
| JP | 60-175009 | 9/1985 |
| WO | WO 98/53360 | 11/1998 |
| WO | WO 00/41650 | 7/2000 |
| WO | WO 01/02896 | 1/2001 |
| WO | WO 01/88654 A2 | 11/2001 |
| WO | WO 01/89421 A1 | 11/2001 |
| WO | WO 02/32297 A2 | 4/2002 |

* cited by examiner

CUSTOM EYEGLASS MANUFACTURING METHOD

FIELD OF THE INVENTION

The present invention relates generally to a custom eyeglass manufacturing method. More specifically, the present invention pertains to developing a manufacturing method that combines a wavefront measuring device with an imaging system that acquires data from a patient's head. The present invention is particularly, though not exclusively, useful for spectacles that correct for aberrations other than sphere, cylindrical, and axis.

BACKGROUND OF THE INVENTION

Current eyeglass manufacturing technology does not provide lenses that precisely correct a patient's wavefront aberrations. However, new manufacturing techniques that make use of epoxies, cured to different indexes of refraction matching the wavefront aberrations of a patient, present new manufacturing challenges. Specifically, alignment of the spectacle with the patient's optical axis is of the utmost importance when making spectacle lenses that correct for aberrations other than spherical, cylindrical, and axis. In order to ensure such precise alignment, the distance of the lenses from the cornea's apex, the pupil distance, and the centering of the optic axes of the spectacle lens with respect to the patient's pupil (or visual axis) need to be accurately measured.

Accordingly, it is an object of the present invention to provide a manufacturing method which determines the exact location of the nose and ear moldings of a pair of spectacles with respect to the patient's pupils, corneal apexes, and any other parameters necessary to quantify a patient's head and face for future eyeglass fitting.

SUMMARY OF THE PRESENT INVENTION

The custom eyeglass manufacturing method of the present invention includes a system that combines a wavefront measuring device with an imaging system that acquires data from a patient's head. The patient looks into the wavefront measurement system that includes three or four additional cameras for viewing of the patient's head and eyes during examination. In the simplest case, the wavefront measurement device could be a refractor, autorefractor, or phoroptor. In a preferred embodiment, one camera each is mounted to the left and right side of the patient's head in order to obtain an image of the respective side views of the patient's head, including the patient's ears, nose, eyes, and apexes of the corneas. A third camera is placed in front of the patient's face in order to obtain a frontal view, including the nose, eyes, and in particular the pupils of the patient. The frontal view could be covered by one camera, or by two cameras with each covering the area around each of the patient's eyes.

During the wavefront measurement, various gazing angles of the patient's eyes are taken. The optical aberrations for various tasks are measured such as, the patient looking straight ahead for far distance viewing, the patient looking at a lower angle for computer reading applications, and an even lower gazing angle for close-up viewing or reading. The viewing cameras simultaneously acquire images of their respective viewing area. The images are then processed by a computer. The output of the computer is the precise measurement of the patient's pupils, center of the pupils, pupil distance, width of face, ear location, distance of corneal apex from the wavefront measuring device, distance from ear to corneal apex, and other parameters necessary to custom fit a pair of eyeglasses.

In order to help the computer program find some of the areas automatically, pre-formed or custom-made moldings with or without integrated registration markers could be used with this system. In the simplest form, the patient would wear an existing eyeglass frame of known dimensions, which might have registration marks attached to it. The registration marks could be affixed anywhere on the frame, however, locations behind and in front of the ears, and near the nose might be effective.

A moldable material is then used around the patient's ears and nose in order to form a mold to be later used to construct custom nose and ear pads. If registration markers are not applied directly to the frame, then they may be added to the molds before they cure. After imaging the patient, the computer would have stored a right and a left side view, and one or two frontal views of the patient wearing the test frame with the moldable pads.

From these images, the exact location of the nose and ear moldings with respect to each other and with respect to the patient's pupils, corneal apexes, and the test frame can be determined. Using current reproduction processes, the ear and nose moldings obtained from the patient would be duplicated or transformed into custom eye-glass frames or custom eye-glass hinges and nose pads. From the position information obtained through imaging the test frame, any other eye glass frame could be fit or custom manufactured to fit the patient.

DESCRIPTION OF THE DRAWINGS

The novel features of this invention, as well as the invention itself, both as to its structure and its operation, will be best understood from the accompanying drawings, taken in conjunction with the accompanying description, in which like reference characters refer to similar parts, and in which.

DETAILED DESCRIPTION OF A PREFERRED EMBODIMENT

Figure 1:
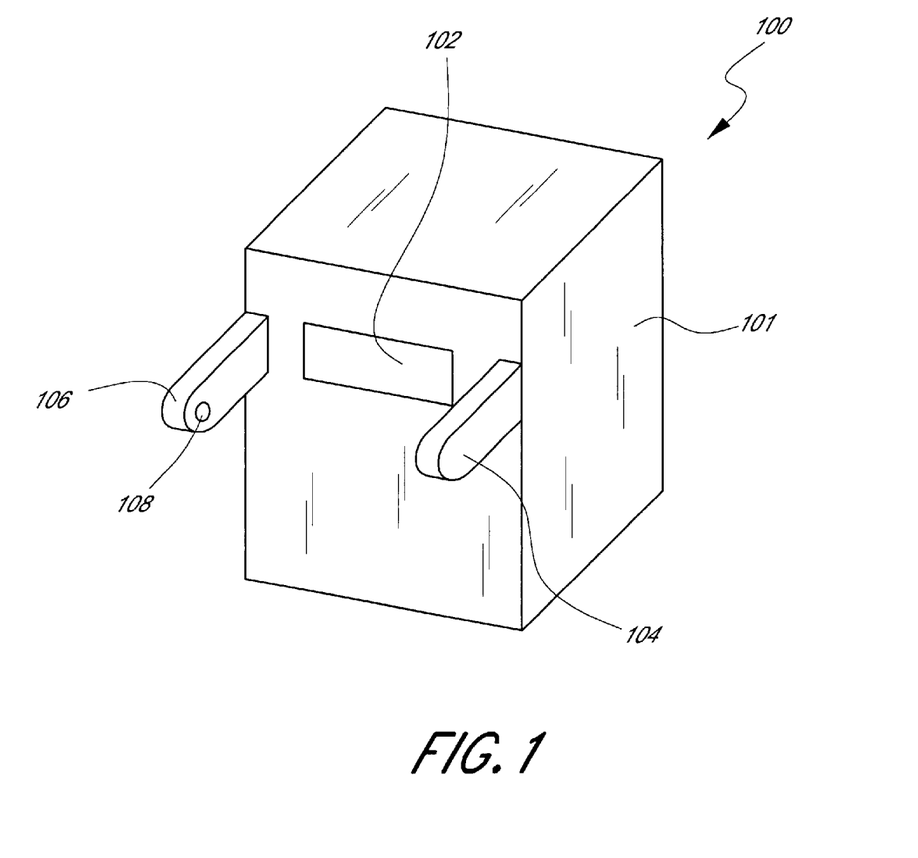
FIG. 1 is a perspective view of a preferred embodiment of the wavefront measurement system of the present invention.

Referring initially to FIG. 1, the wavefront measurement system of the present invention is shown and generally designated 100. FIG. 1 shows that the wavefront measurement system 100 includes a main housing 101 in which a slot 102 allows for one or two cameras (not shown) to be placed in order to image the front of a patient (not shown), while allowing the patient to look at a virtual or real fixation target. Additionally, there may be a right housing 104 and a left housing 106, each extending from the main housing 101 and each having an opening 108 for a camera (not shown).

Figure 2:
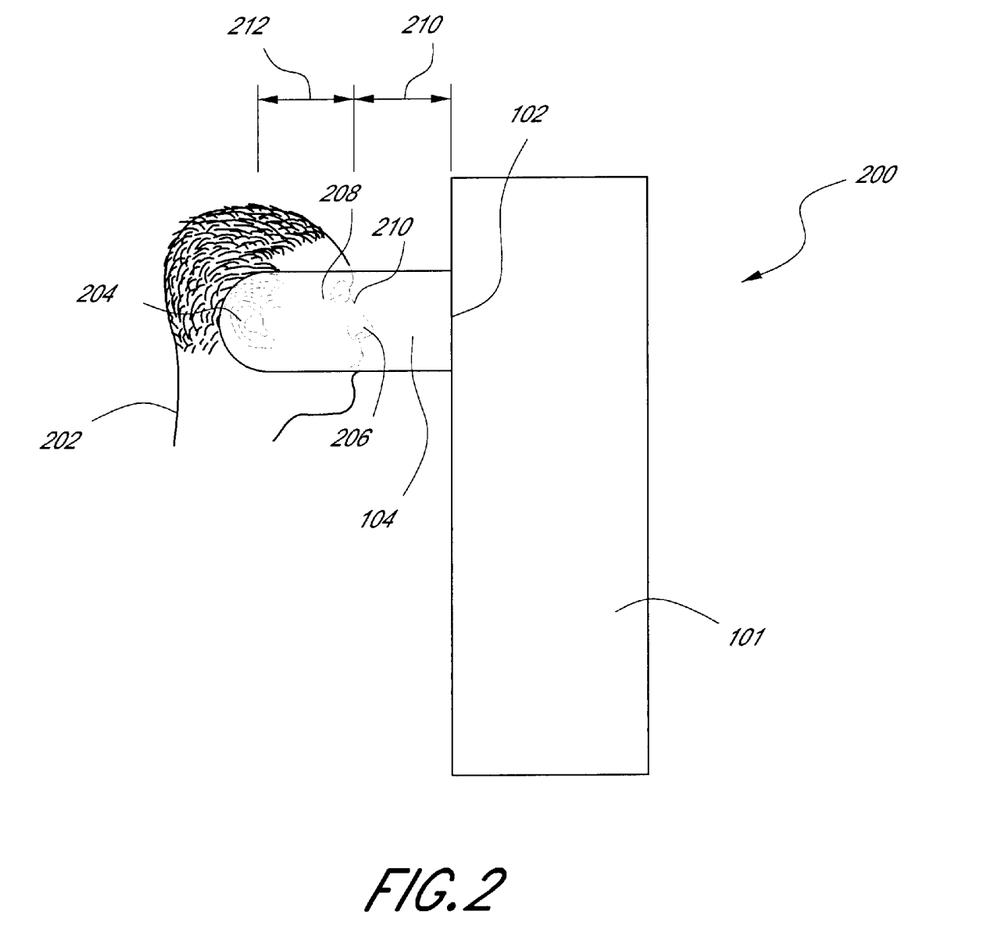
FIG. 2 is a side view of the wavefront measurement system.

Referring now to FIG. 2, the wavefront measuring system of FIG. 1 is shown from a side view and is generally designated 200. FIG. 2 shows a patient 202 facing the wavefront measuring system main housing 101 and slot 102. A camera (not shown) mounted within right housing 104 photographs the side of patient's 202 head, including the patient's 202 ear 204 and nose 206. The camera or cameras mounted in slot 102 image the patient's 202 eyes 208, and specifically the pupil 210.

Figure 3:
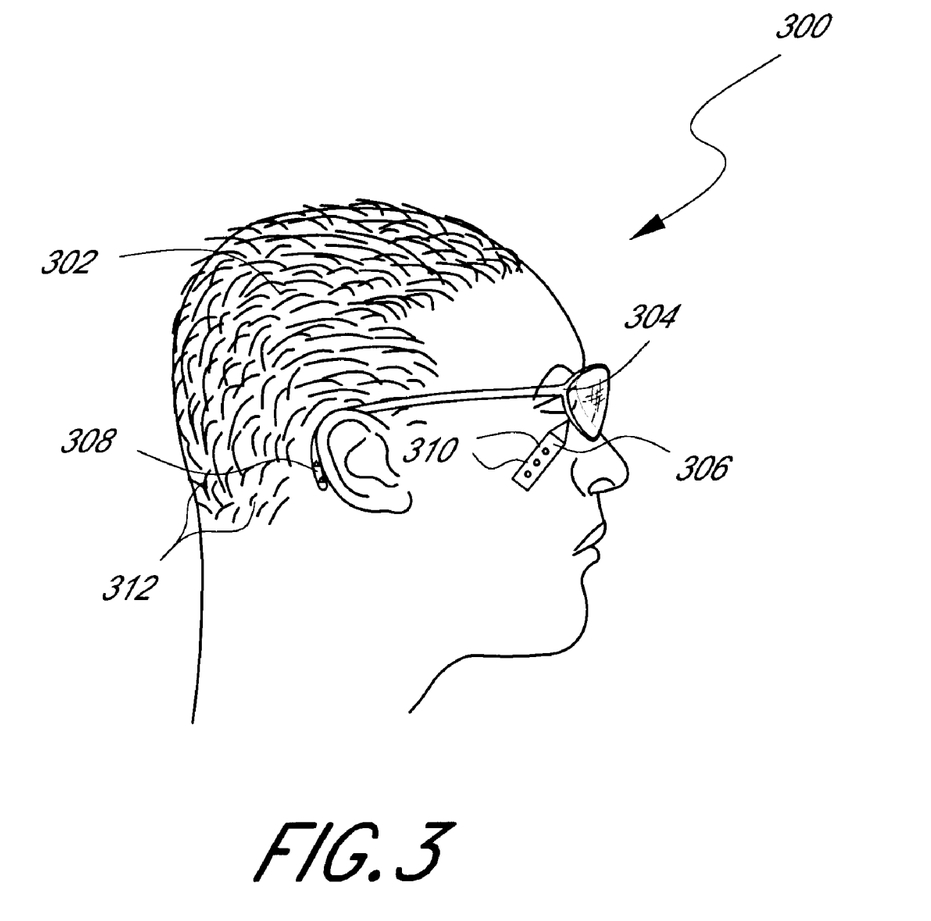
FIG. 3 is a side view of patient with test frame and moldings.

FIG. 3 shows a patient 302 wearing a eyeglasses frame 304 with known dimensions. The frame 304 is mounted to a nose molding 306, and an ear molding 308. Before both the nose molding 306 and the ear molding 308 have cured, registration markers 310 and 312 may be placed upon the nose molding 306 and ear molding 308 respectively. The patient 302 may then be imaged by the wavefront measuring system 100 while wearing the frame 304 such that the wavefront measuring system 100 may use either the test frame 304, the registration markers 310 and 312, or both in order to more accurately quantify the patient's 302 head and face for future eyeglass fittings.

Figure 4:
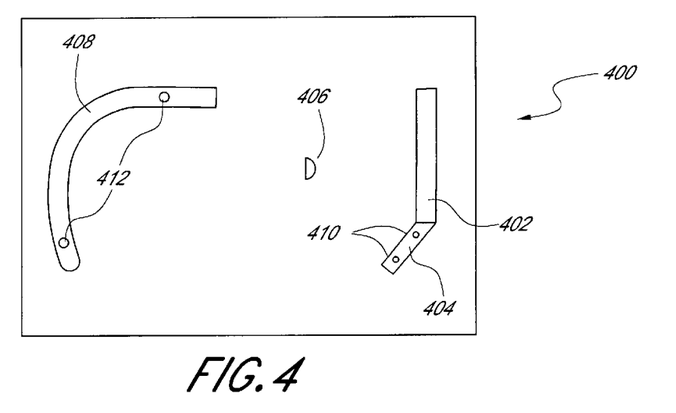
FIG. 4 is a right side view of patient with test frame and moldings.

FIG. 4 shows a right image of a patient and is generally designated 400. In FIG. 4, there is a right lens opening 402 attached to a right nose molding 404. The patient's right corneal apex 406 and right ear molding 408 can also be seen in the image. The registration marks 410 on the right nose molding 404 and the registration marks 412 on the right ear molding 408 aid the computer in determining the exact locations of the right nose molding 404 and the right ear molding 408 with respect to each other, and with respect to the patient's right corneal apex 406.

Figure 5:
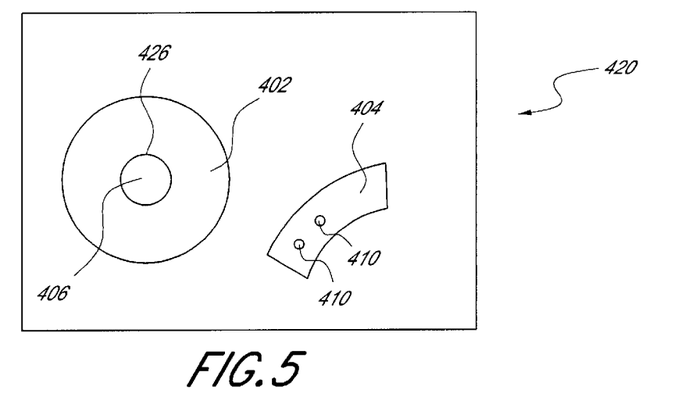
FIG. 5 is a right front side view of patient with test frame and moldings.

FIG. 5 shows a right front image of a patient and is generally designated 420. In FIG. 5, the patient's right pupil 426, the right lens opening 402, the right nose molding 404, and the registration marks 410, can be seen in the image.

Figure 6:
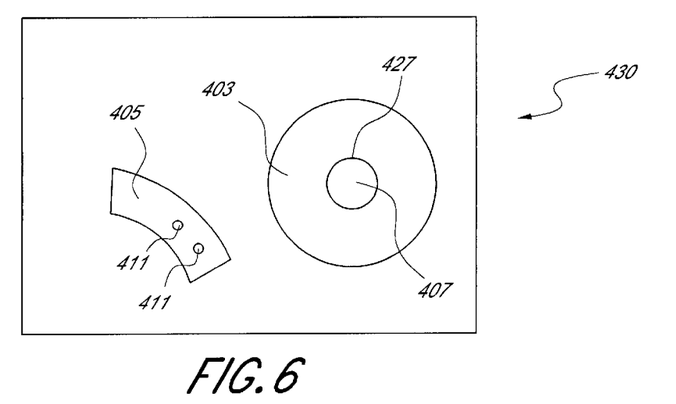
FIG. 6 is a left front side view of patient with test frame and moldings.

FIG. 6 shows a left front image of a patient and is generally designated 430. In FIG. 6, the patient's left pupil 427, the left lens opening 403, the left nose molding 405, and the registration marks 411, can be seen in the image.

Figure 7:
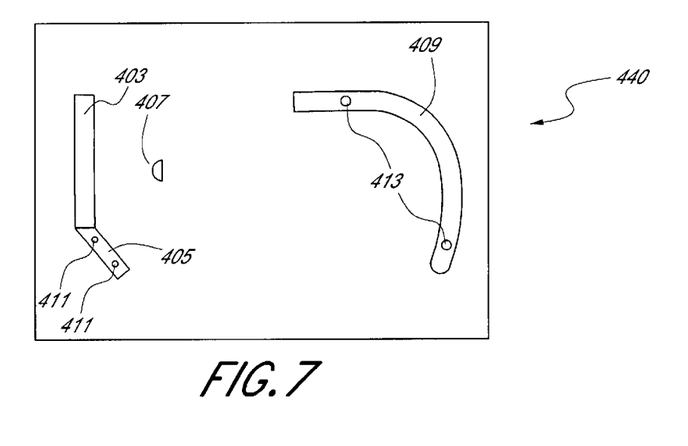
FIG. 7 is a left side view of patient with test frame and moldings.

FIG. 7 shows a left side image of a patient and is generally designated 440. In FIG. 7, there is a left lens opening 403 attached to a left nose molding 405. The patient's left pupil 407 and left ear molding 409 can also be seen in the image. The registration marks 411 on the left nose molding 405 and the registration marks 413 on the left ear molding 409 aid the computer in determining the exact locations of the left nose molding 405 and the left ear molding 409 with respect to each other, and with respect to the patient's left pupil 407.

After imaging the patient, the computer would have stored a right and a left side view, and two frontal views of the patient wearing the test frame 304, including the moldable nose pads 306 and moldable ear pads 308, while being examined with the wavefront measuring system. From the images, the exact location of the moldable nose pads 306 and the moldable ear pads 308 with respect to each other and the respect to the patient's pupils 426 and 427, corneal apexes 406 and 407, and the test frame 304 can be determined.

Figure 8:
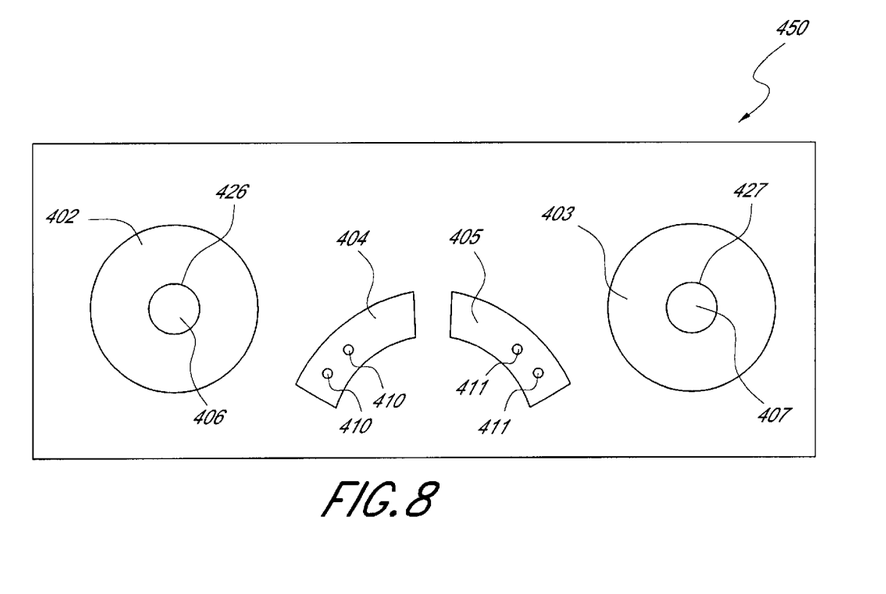
FIG. 8 is a front view of patient with test frame and moldings.

FIG. 8 shows a frontal image of a patient's face and is generally designated 450. In FIG. 8, only one camera is used to image the face and therefore the image contains both lens openings 402, 403, nose moldings 404, 405, and pupils 426 and 427.

Figure 9:
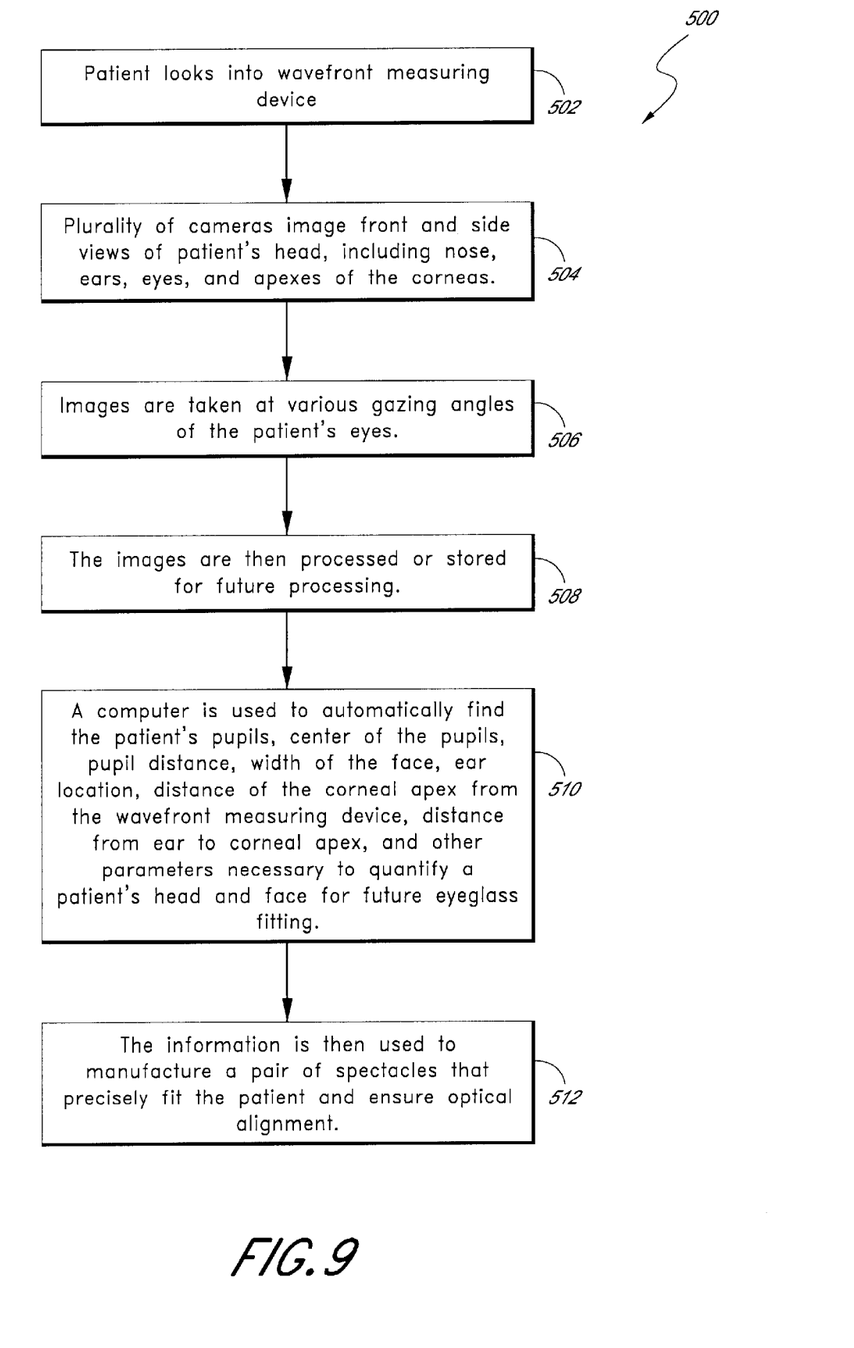
FIG. 9 is a flowchart illustrating a sequence of steps to manufacture custom eyeglasses.

FIG. 9 is a flowchart illustrating a sequence of steps to manufacture custom eyeglasses and is generally designated 500. In step 502, the patient looks into the wavefront measuring device in order to be imaged by the device. Once the patient is in a proper position, step 504 mandates that a plurality of cameras image the front and sides of the patient's face as can be seen in FIG. 2. Camera placement is only constrained by the need to image both the sides and front face of the patient, and therefore is not constricted to the configuration as depicted in FIG. 2. Step 506 indicates that it is necessary to take images at various gazing angles of the patient's eyes. Optical alignment for all gazing angles is a critical requirement when correcting for higher order aberrations. Therefore step 506 should be performed to ensure the custom eyeglasses function properly. Additionally, step 507 requires that wavefront measurements be taken for each of the images taken in step 506. In step 508, the computer processes the information and returns the output in step 510. The output consists of the locations of the patient's pupils, center of the pupils, pupil distance, width of face, ear location, distance of the corneal apex from the wavefront measuring device, distance from the ear to corneal apex, and other parameters necessary to measure a patient's head and face for eyeglass fittings. Using this information, collectively referred to as lens-mounting parameters, a pair of custom spectacles may be produced as indicated by step 512.

Figure 10:
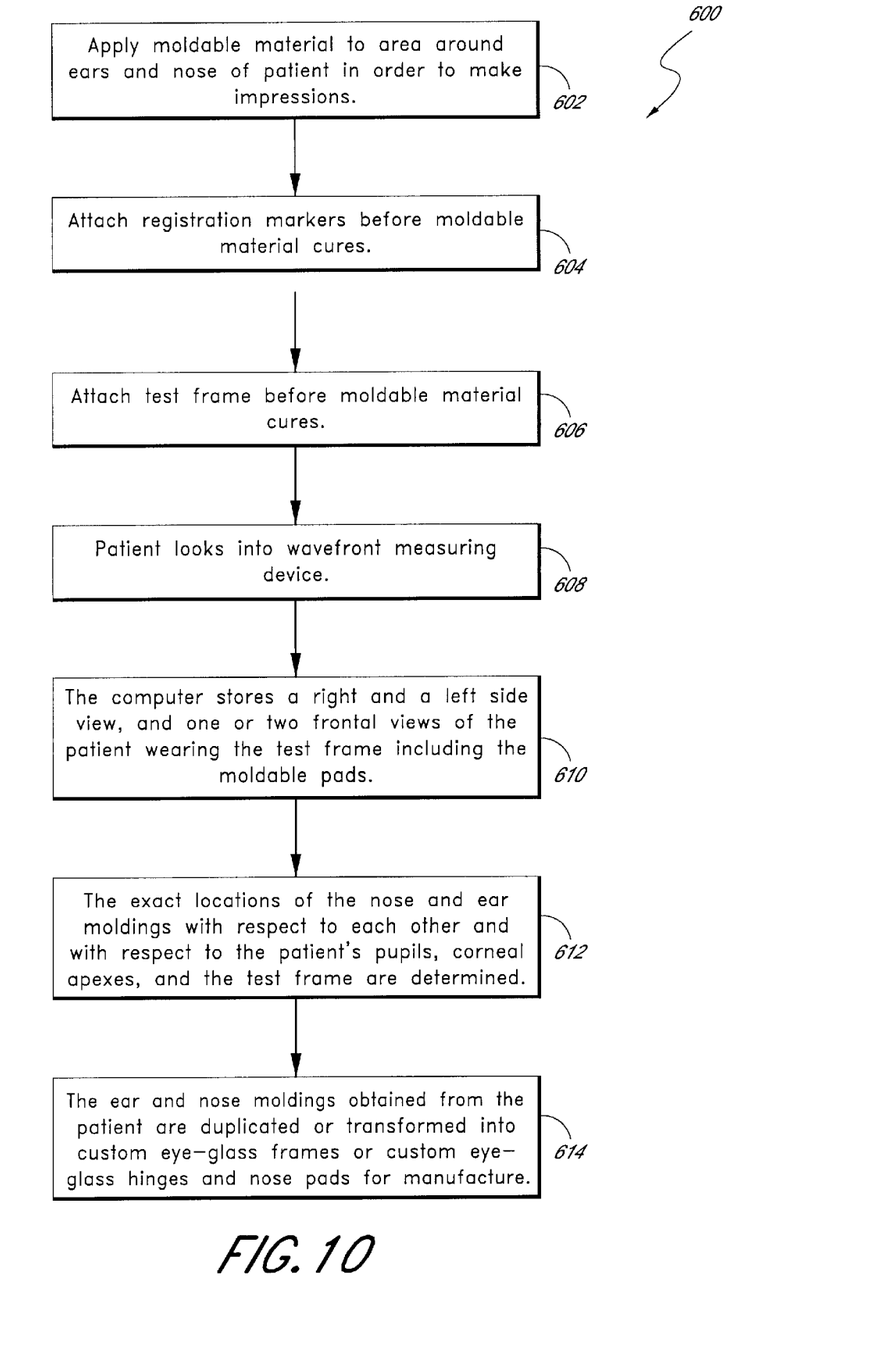
FIG. 10 is a flowchart illustrating an alternative sequence of steps to manufacture custom eyeglasses.

FIG. 10 is a flowchart illustrating an alternative sequence of steps to manufacture custom eyeglasses and is generally designated 600. In step 602, moldable material is applied around the nose and the area around the ears of the patient as can be seen in FIG. 3. The moldable material allows for a more conventional means of obtaining an accurate surface profile of the patient's nose and around the ears. In order to relate the moldings to wavefront measuring device, step 604 calls for registration markers are added before the moldings cure. The registration markers provide a means for the wavefront measuring device to gauge the molds with respect to the patient's face. Step 606 attaches a test frame of known dimensions to the moldable material before it cures. The registration markers of step 604 may or may not be affixed to the frame in step 606. The frame of step 606 and the molding of step 602 along with the registration markers of 604 can all be seen in FIG. 3. Step 608, similarly to step 502 of FIG. 9, calls for the patient to look into the wavefront measuring device. In step 610, the computer stores a right and a left side view, and one or two frontal views of the patient wearing the test frame including the moldable pads. The computer in step 612 returns the output of all the same parameters as indicated by step 510 of FIG. 9, but additionally includes the information with respect to the test frame and the moldings. Lastly, step 614 calls for the moldings to be duplicated or transformed into custom eyeglass hinges and nose pads for conventional frames.

In a preferred embodiment of the present invention, the various moldings may be made of silicone. However, it is to be appreciated that any material capable of conforming to a person's head is suitable for use in the present invention.

Figure 11:
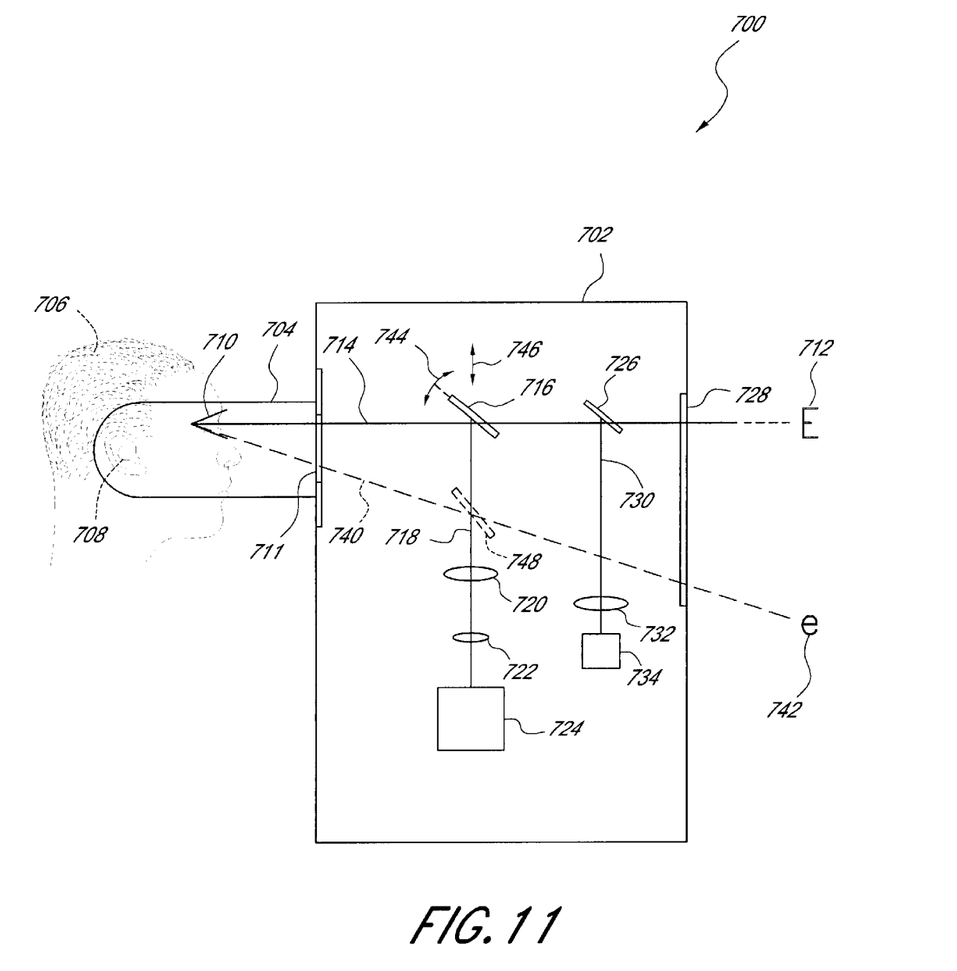
FIG. 11 is a side view of a wavefront measurement system of the present invention showing the internal measurement devices within the system.

Referring now to FIG. 11, a preferred embodiment of the eyeglass measurement system is shown and generally designated 700. System 700 includes a main housing 702 having a right side housing 704 and a left side housing (not shown this Figure) spaced apart to receive a person's head 706 such that his or her ears 708 are positioned between the side housings, and the patient's eyes 710 is positioned adjacent slot 711 on main housing 702.

As shown, the patient views a real fixation target 712 along an optical axis 714. Positioned along the optical axis 714 is a tiltable dichroic beam splitter 716 which splits a portion of the light passing from the patient's eye 710 to a secondary axis 718. The light passing along the secondary axis passes through a pair of imaging lenses 720 and 722 and onto a wavefront sensor 724, such as a Hartmann-Shack sensor.

In addition to the formation of secondary axis 718, an additional beam splitter 726 may be positioned along the optical axis to split a portion of light passing along the optical axis to a tertiary axis 730. The light passing along the tertiary axis passes through an imaging lens 732 ant onto an imaging device, such as a charge coupled device (CCD) camera.

In order to provide an analysis of the eye for an eye when focussing at different focal lengths, a second, virtual target 742 may be provided along a second optical axis 740. In order for a portion of the light passing along the second optical axis to be received by the wavefront sensor 724, beam splitter 716 may be pivoted in angles 744, and may also be moved in directions 746 to properly position the splitter 716 on second optical axis 740 (as shown by dashed lines 748).

Using the eyeglass measuring system 700 of the present invention facilitates the manufacturing of eyeglasses in accordance with method 600. By providing a single measurement system for measuring the optical correction needed for two distinct gazing angles, or optical axes, a corrective lens may be created which precisely matches the patients needs.

While the custom eyeglass manufacturing method as herein shown and disclosed in detail is fully capable of obtaining the objects and providing the advantages herein before stated, it is to be understood that it is merely illustrative of a preferred embodiment and an alternative embodiment of the invention and that no limitations are intended to the details of construction or design herein shown other than as described in the appended claims.

I claim:

1. A method of making a custom pair of eyeglasses, the method comprising the steps of:
   positioning a plurality of cameras around a patient's head in order to image front and side views of said patient's head;
   applying moldable material to nose, temples, and behind ears of said patient to obtain moldings;
   attaching a test frame of known dimensions to said moldable materials;
   imaging said front and side views of said patient's head;
   processing said images to determine lens-mounting parameters of said patient's head; and
   using said lens mounting parameters to manufacture a pair of eyeglasses that precisely fit said patient.

2. The method of claim 1 further comprising:
   attaching registration markers to said test frame.

3. The method of claim 1 further comprising:
   attaching registration markers to said moldable material.

4. The method of claim 1 further comprising:
   attaching registration markers to said moldable material; and
   using said moldings to create custom hinges, ear pads, and nose pads as part of said pair of eyeglasses.

5. The method of claim 1, further comprising a step of obtaining wavefront measurements of said patient's eyes.

6. The method of claim 5 where said step of imaging said front and side views of said patient's head is conducted while conducting said step of obtaining wavefront measurements of said patient's eyes.

7. The method of claim 5, wherein said wavefront measurements are obtained for a plurality of gazing angles, viewing distances, or both.

8. A custom eyeglass manufacturing system comprising:
   a wavefront measurement device; and
   an imaging system configured to acquire imaging system data from a patient's head to determine lens-mounting parameters.

9. The system of claim 8 configured to acquire wavefront measurement data.

10. The system of claim 9 configured to acquire said wavefront measurement data and said imaging system data substantially simultaneously.

11. The system of claim 8 wherein said imaging system comprises a plurality of cameras.

12. The system of claim 8 wherein said wavefront measurement device comprises a refractor, autorefractor, or phoropter.

13. The system of claim 8 wherein said wavefront measurement device comprises a wavefront sensor.

14. The system of claim 13 wherein said wavefront sensor comprises a Hartmann-Shack sensor.

15. The system of claim 8 wherein said lens mounting parameters include the location of a patient's pupils.

16. The system of claim 15 configured to acquire said wavefront measurement data and said imaging system data for at least one selected from the group consisting of a plurality of gazing angles, a plurality of pupil locations, and a plurality of viewing distances.

17. A method of making a custom pair of eyeglasses that comprises acquiring imaging system data from a patient's head using the system of claim 8.

18. The method of claim 17 that further comprises acquiring wavefront measurement data.

19. The method of claim 18, wherein said wavefront measurement data is obtained for a plurality of gazing angles, viewing distances, or both.

* * * * *